United States Patent [19]

Beleck

[11] Patent Number: 5,798,325
[45] Date of Patent: Aug. 25, 1998

[54] COMPOSITION AND PROCESS FOR BARRIER COATING AND/OR CLEANING PAINT MASKS

[75] Inventor: Scott J. Beleck, St. Clair Shores, Mich.

[73] Assignee: Henkel Corporation, Plymouth Meeting, Pa.

[21] Appl. No.: 789,674

[22] Filed: Jan. 24, 1997

[51] Int. Cl.$^6$ ........................................ C09D 9/00
[52] U.S. Cl. .................. 510/201; 510/206; 510/212; 510/213
[58] Field of Search .................. 510/201, 206, 510/212, 213

[56] References Cited

U.S. PATENT DOCUMENTS

| | | | |
|---|---|---|---|
| 3,531,311 | 9/1970 | Prior | 117/6 |
| 3,846,172 | 11/1974 | Fossati | 134/4 |
| 4,002,571 | 1/1977 | Anderle et al. | 510/206 |
| 4,732,695 | 3/1988 | Francisco | 510/212 |
| 4,749,510 | 6/1988 | Nelson | 510/212 |
| 4,844,833 | 7/1989 | Komatsu et al. | 510/206 |
| 5,030,290 | 7/1991 | Davis | 510/212 |
| 5,038,809 | 8/1991 | Rodgers et al. | 134/111 |
| 5,188,675 | 2/1993 | Dormon-Brailsford | 510/212 |
| 5,308,527 | 5/1994 | Lallier et al. | 510/201 |
| 5,443,748 | 8/1995 | Bergishagen et al. | 510/201 |
| 5,597,787 | 1/1997 | Barnett | 510/203 |

OTHER PUBLICATIONS

"Barriercoat Process Paint Stripping: Mask Washing Without Solvents", *Metal Finishing*, Oct. 1996, pp. 33–36, Crosley, D.

*Primary Examiner*—Ellen M. McAvoy
*Attorney, Agent, or Firm*—Ernest G. Szoke; Wayne C. Jaeschke; Norvell E. Wisdom, Jr.

[57] ABSTRACT

An improved aqueous liquid composition for power washing of paint masks contains: organic film-forming polymer, preferably polyacrylamide; inorganic salts, preferably a combination of alkali metal pyrophosphate, metaborate, and tetraborate; and dissolved organic molecules that (i) are hydrocarbons except for having hydroxyl substituents and, optionally, having one or more other types of substituents selected from halogen atoms, keto groups, and aldehydo groups and (ii) have a number ratio of oxygen atoms to carbon atoms that is at least 0.5; and, optionally but preferably, free boric acid.

20 Claims, No Drawings

COMPOSITION AND PROCESS FOR BARRIER COATING AND/OR CLEANING PAINT MASKS

BACKGROUND OF THE INVENTION

1. Field of the Invention

This invention relates to a composition and process for use with paint masks, to provide them with a barrier coating to prevent tight adhesion of paint to the masks, clean the masks when paint has accumulated on them, or both. Paint masks are solid objects constituted of a material not soluble in or otherwise damaged by the paint(s) to be used with the masks. A paint mask contains openings and has a surface shape so that it fits closely to a surface of another object to be painted with a decorative or functional pattern. When paint is then sprayed against or otherwise applied to the outer surface of the mask, the paint penetrates to the surface of the underlying object only in a pattern that matches that of the hole(s) in the mask, while at least some paint normally adheres to the solid parts of the mask that define the hole(s) in it. One of the most generally known types of paint mask is a stencil suitable for painting numbers and letters on flat surfaces such as packing crates. However, much more elaborate types of paint masks, many suitable for decoratively painting curved surfaces such as those of automobile bodies, are widely used in industry.

2. Statement of Related Art

When a paint mask is repeatedly used, the accumulation of paint on it eventually reduces the size and often modifies the shape of the pattern produced with the mask, as accumulated paint solids come to occupy part of the space that was originally part of the hole(s) in the mask. Whenever these unwanted modifications of the pattern formed by using the mask exceed the tolerance of the user for variation of the pattern produced, the mask must be cleaned before being used again.

Prior to the passage of the Federal Air Quality Act in 1967, accumulated paint residues on masks were normally cleaned therefrom by dissolution of the paint residues in suitable organic solvents. Substantial emissions of solvent vapors into the air resulted. This method became impractical in most U.S. urban areas and in many other locations after adoption of the limits on solvent emissions now imposed by law. Since that time it has become customary to use barrier coating of paint masks that are expected to need frequent cleaning. A barrier coating of water soluble material applied to a clean paint mask prior to its use permits relatively easy removal of accumulated paint residues on the mask by contact with hot aqueous solutions which dissolve the underlying barrier coat and thereby loosen the paint residues adhered to it, so that the residues can be removed by mechanical forces of relatively moderate magnitude.

Since the publication of U.S. Pat. No. 3,846,172 to Fossati in 1974, it has been known that the removal of paint from a previously used mask bearing a suitable barrier coating and formation of a new barrier coating on the thus cleaned mask can be combined into a single step by treatment with a suitable aqueous composition containing film forming ingredients. The efficiency of using paint masks has been further increased by the introduction of pressure flood mask washing process equipment, which conveniently supplies additional mechanical force to increase the removal of particularly stubbornly attached types of paint residue. Further details are given by D. Crosley, "Barriercoat Process Paint Stripping: Mask Washing Without Solvents", Metal Finishing, October 1996, pp. 33–36.

DESCRIPTION OF THE INVENTION

Object of the Invention

The major object of this invention was to provide a more nearly ideally performing composition and process for forming effective barrier coats, removing accumulated paint residues and barrier coats from masks bearing such residues on their barrier coated surfaces, or more preferably, both in a single step process.

Ideal characteristics of a composition for this purpose include: minimal foam formation; resistance to growth of any microorganisms that may enter the composition from the ambient environment; formation of a film with substantially constant thickness and a smooth surface over the entire area of application; suitability for completing removal and redeposition in a short time, preferably not more than 5 minutes, at a normal operating temperature of about 77° C. or less; stability at temperatures up to at least 88° C. for an extended length of time; adequate detackification of any removed paint residues that have tack, to avoid redeposition on the mask(s) being cleaned; formation of a low-slip surface on drying, to make handling after treatment less susceptible to problems; and avoidance of adverse effects on human health from contacts of the composition and/or a film formed from it with human skin, because manual handling of the masks is often used as part of the most convenient method of removing them from contact with the composition after completion of cleaning and formation of a fresh barrier coat and/or of returning recoated and dried masks for reuse. Accordingly, the major object of this invention is to provide novel compositions and processes that are more preferable in at least one of these respects, especially for single step processes as noted above, than are the compositions and processes now available in the art.

General Principles of Description

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the specification, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation within any combination by reactions specified in the description, and does not necessarily preclude chemical interactions among the constituents of a mixture once mixed; specification of materials in ionic form implies the presence of sufficient counterions to produce electrical neutrality for the composition as a whole; any counterions thus implicitly specified should preferably be selected from among other constituents explicitly specified in ionic form, to the extent possible; otherwise such counterions may be freely selected, except for avoiding counterions that act adversely to the object(s) of the invention; the terms "molecule" and "mole" and their grammatical variations may be applied to ionic, elemental, or any other type of chemical entities defined by the number of atoms of each type present therein, as well as to substances with well-defined neutral molecules; the first definition of an acronym or other abbreviation applies to all subsequent uses herein of the same abbreviation and applies mutatis mutandis to normal grammatical variations of the initially defined abbreviation; the term "paint" includes all like materials that may be designated by more specialized terms such as lacquer, enamel, varnish, shellac, and the like; and the term "polymer" includes "oligomer", "homopolymer", "copolymer", "terpolymer", and the like.

SUMMARY OF THE INVENTION

A composition according to this invention is an aqueous liquid composition comprising, preferably consisting essentially of, or still more preferably consisting of, water and:

(A) an amount of a component of dissolved organic film-forming polymer;

(B) an amount of a component of dissolved inorganic salts; and (C) an amount of a component of dissolved organic molecules that (i) are hydrocarbons except for having hydroxyl substituents and, optionally, having one or more other types of substituents selected from halogen atoms, keto groups, and aldehydo groups, (ii) have a number ratio of oxygen atoms to carbon atoms that is at least 0.5, and (iii) are not part of any of the previously recited components; and, optionally, one or more of the following:

(D) an amount of a component of biocidal material, exclusive of any that forms part of any of the previously recited components;

(E) an amount of a component of wetting agent, exclusive of any that forms part of any of the previously recited components;

(F) an amount of a component of antifoam agent, exclusive of any that forms part of any of the previously recited components; and (G) an amount of a component of dispersed undissolved finely divided solids, exclusive of any that forms part of any of the previously recited components. A polymer is defined as "film forming" for the purposes of this description if, when a solution or suspension of the polymer in water containing at least 20% of the polymer is dried at a temperature of at least 25° C. from a liquid film thickness not greater than 1 millimeter, a continuous and coherent film that is solid at 25° C. is produced.

A composition according to the invention may be ready for immediate use, in which instance it may be called a "working composition", or it may be more suitable for dilution with water to form such a working composition, in which instance the original composition may be called a "concentrate", "concentrate composition", or "concentrated composition", all three of which terms are considered equivalent in meaning herein. Some compositions according to the invention may, of course, be suitable for both uses under appropriate conditions.

A process according to this invention comprises, at a minimum, a step of contacting a surface of a solid substrate that is not soluble in a composition according to the invention with such a composition for a sufficient time to accomplish at least one and preferably both of the following: (1) removing from said surface any paint residues present thereon and (2) forming on said surface a liquid layer of the composition, said liquid layer having the properties that it (2.1) adheres to said surface when said solid substrate is removed from contact with any part of said composition according to the invention that is not part of said liquid layer and (2.2) when dried in place on said surface of said solid substrate, forms a solid water soluble coating over said surface. Additional steps, which may be conventional per se, can also be part of a process according to this invention.

DESCRIPTION OF PREFERRED EMBODIMENTS OF THE INVENTION

For various reasons, it is often preferred that compositions according to the invention be substantially free from various constituents that can cause practical difficulties when present. More particularly, with increasing preference in the order given and with independent preference for each noted component, compositions according to the invention preferably contain no more than 4.0, 2.2, 0.90, 0.50, 0.20, 0.12, 0.070, 0.030, 0.010, 0.0050, 0.0020, 0.0010, 0.00050, 0.00020, or 0.00010 grams of constituent per kilogram of total composition (hereinafter usually abbreviated as "g/kg") of any of the following: cations selected from the group consisting of $Zn^{+2}$, $Ni^{+2}$, $Mn^{+2}$, $Co^{+2}$, $Cu^{+2}$, $Fe^{+2}$, $Ca^{+2}$, $Mg^{+2}$, and all metal cations with a valence of 3 or higher; sulfate, chloride, bromide, iodide, and nitrate anions; and any complexing agents for iron cations that are not part of component (C) as defined above.

Details of preferred compositions according to the invention depend on whether the compositions are intended to remove paint residue that include water-soluble, or spontaneously water-redispersible, solids as a substantial fraction, usually at least 50%, of their total solids content. If the paint was applied from aqueous dispersion or solution, residues from such paint may well be water-soluble or spontaneously water-redispersible, while if the paint was nonaqueous-solvent-borne, its residues generally will not be water-soluble or spontaneously water-redispersible. If the paint residues to be removed are water-soluble or spontaneously water-redispersible, a coagulant is needed to convert these residues to a solid phase that can be readily separated from the liquid washer composition; otherwise, the dissolved paint residues will eventually accumulate with continued use of a composition according to the invention until redeposition of paint residues will occur simultaneously with formation of a new protective coating in a process according to the invention, to an extent that will compromise the protective quality of the new coating formed. Also, in order to favor coagulation, somewhat lower electrolyte concentrations are preferred when removing paint residues that are water-soluble and/or spontaneously water-redispersible. On the other hand, if no significant amount of the paint residues is water-soluble or water-redispersible, no coagulant is usually needed, because such paint residues will not re-enter the liquid phase of a composition according to the invention during its use, even in the absence of a coagulant. If all the paint residues to be removed are of this type, the compositions according to the invention can be made more economical by omitting the coagulant. The preferences below will be described for the two extreme cases of completely water-soluble and/or spontaneously water-redispersible paint residues and completely insoluble and non-redispersing paint solids whenever the preferences are different for these two intended uses, but it will be understood that one skilled in the art can vary these preferences appropriately in a less common case of paint residues that include substantial amounts of both types of solid materials.

Preferred substances for polymer component (A) as described above include hydroxyetherified cellulose, polyacrylamide and polymethacrylamide, poly{acrylic acid} and poly{methacrylic acid}, poly{vinyl alcohol}, polymers of unsaturated quaternary ammonium salt monomers, poly{vinyl amine}, water soluble polyamides, poly{vinyl formal}, and poly{ethylene oxide}, in each instance with comonomers possible although usually not preferred. If the paint residues to be removed are all not water-soluble and/or spontaneously water-redispersible, only nonionic polymers are more preferred because of their better compatibility with high concentrations of inorganic electrolytes; polyacrylamide is most preferred. Independently, the weight average molecular weight of the nonionic polymer molecules in component (A), which may be designated hereinafter as component or subcomponent (A.1) and may constitute all of component (A), preferably is at least, with increasing preference in the order given, 200, 300, 400, 500, 600, 700, 800, 900, 1000, 1100, 1200, 1300, 1400, or 1475 and independently preferably is not more than, with increasing preference in the order given, $10^7$, $10^6$, $10^5$, $10^4$, 8000, 6000, 4000, 3000, 2500, 2000, or 1525.

If all of the paint residues to be removed are water-soluble and/or spontaneously water-redispersible, the presence of component (A.1) as described above in a composition according to the invention is still preferred, but in this instance in combination with a subcomponent (A.2) of cationic polymers, preferably those containing quaternary ammonium groups. Relative amounts of subcomponents (A.1) and (A.2) preferably are such that the ratio of subcomponent (A.1) to subcomponent (A.2) in a composition according to this invention preferably is at least, with increasing preference in the order given, 0.20:1.0, 0.40:1.0, 0.60:1.0, 0.80:1.0, 1.00:1.0, 1.20:1.0, 1.40:1.0, 1.50:1.0, 1.60:1.0, 1.70:1.0, 1.80:1.0, 1.90:1.0, or 1.97:1.0 and independently preferably is not more than, with increasing preference in the order given, 20:1.0, 16:1.0, 12:1.0, 10.0:1.0, 8.0:1.0, 7.9:1.0, 6.0:1.0, 5.0:1.0, 4.4:1.0, 3.8:1.0, 3.2:1.0, 2.6:1.0, 2.4:1.0, 2.3:1.0, 2.20:1.0, 2.10:1.0, or 2.02:1.0.

Subcomponent (A.2) is more preferably selected from the group consisting of condensation copolymers of organic di-tertiary amines with dichloroethers or epichlorohydrin, epichlorohydrin being preferred. The di-tertiary amines may be formed in situ by reaction of secondary amines with epichlorohydrin. Still more preferably, a third monomer component of organic di-primary amines is also used to make the condensation polymers for subcomponent (A.2). Independently, the number of carbon atoms between functional moieties selected from the group consisting of chloro, epoxide, and amino moieties in any difunctional monomer from which such a polymer is made is not more than, with increasing preference in the order given, 6, 4, 3, or 2. Independently of all other preferences, the weight average molecular weight of polymeric constituents of subcomponent (A.2) preferably is at least, with increasing preference in the order given, $10^3$, $10^4$, $10^5$, or $10^6$ and independently preferably is not more than $10^7$. If the molecular weight is too low, flocculating effectiveness will be reduced, while if the molecular weight is too high there is serious danger of gellation of any aqueous solution containing a sufficient amount of the polymer to make a preferred concentrate according to the invention. The most preferred constituent of subcomponent (A.2) is a polymer (in aqueous solution) sold under the name MAGNIFLOC™ 577-C by Cytec and reported by its supplier to be a polymer of dimethyl amine, ethylene diamine, and chlorohydrin.

In a concentrate according to the invention, when component (A.1) of nonionic polymer constitutes all of component (A), the total amount of water soluble film-forming polymer component (A), on a solids basis, preferably is at least, with increasing preference in the order given, 4.0, 6.0, 8.0, 9.0, 10.0, 11.0, 12.0, 13.0, 14.0, 14.5, or 14.9% of the total composition and independently, primarily for reasons of economy, preferably is not more than, with increasing preference in the order given, 50, 40, 30, 25, 22, 19, 18.0, 17.0, 16.5, 16.0, 15.5, or 15.1% of the total composition. In contrast, if both subcomponents (A.1) and (A.2) as defined above are present as part of component (A), the total amount of water soluble film-forming polymer component (A), on a solids basis, preferably is at least, with increasing preference in the order given, 6.0, 9.0, 12.0, 13.5, 15.0, 16.5, 18.0, 19.5, 21.0, 22.5, 24.0, 25.0, 26.0, 27.0, 28.0, 29.0, or 29.7% of the total composition and independently, primarily for reasons of economy, preferably is not more than, with increasing preference in the order given, 50, 47, 44, 41, 38, 36, 34.0, 33.0, 32.0, 31.5, 31.0, 30.5, or 30.3% of the total composition.

The substance(s) and amount(s) used for component (B) preferably should be such that the pH of a working composition is between 7.5 and 11. Additionally, if component (A) consists of nonionic polymers only, then the pH of a working composition preferably is at least, with increasing preference in the order given, 7.5, 8.0, 8.2, 8.4, 8.6, 8.8, 8.90, or 9.00 and independently preferably is not more than, with increasing preference in the order given, 11.0, 10.5, 10.0, 9.8, 9.6, 9.50, 9.40, 9.30, 9.20, or 9.10. These preferred pH levels can be achieved with a wide variety of known alkaline salts. However, it has been found that, to optimize the properties of a dried barrier coating formed with a composition according to the invention, it is preferable for component (B) as defined above to contain at least two subcomponents: (B.1) alkali metal phosphate and/or condensed phosphate, most preferably pyrophosphate and (B.2) alkali metal borate and/or condensed borate, most preferably both borate and tetraborate, and the preference for these materials is independent of the separate preference for the pH value of a working composition according to the invention, because these particular materials appear, for reasons unknown, to produce favorable physico-chemical properties in the dried film coatings formed. Further and independently, potassium salts are most preferred for component (B.1) and for any metaborate content of component (B.2), while sodium salts are most preferred for any tetraborate part of subcomponent (B.2). The borates and/or the phosphates may be supplied in situ by adding the corresponding acid(s) and hydroxide(s) or oxide(s). When this method is used, any alkali metal or ammonium hydroxide added to a composition according to the invention is assumed to react to the fullest extent permitted by stoichiometry with any free boric, phosphoric, or condensed boric or phosphoric acid also added to the same composition, and any excess of either free acid, oxide, or hydroxide added is assumed to remain free in the ultimate composition unless otherwise noted. (Reaction with boric acid is assumed to produce metaborates.)

When component (B) contains subcomponents (B.1) and (B.2) as defined above, if component (A) consists solely of nonionic polymers, the molar ratio of (B.1) to (B.2) preferably is at least, with increasing preference in the order given, 0.10:1.0, 0.20:1.0, 0.40:1.0, 0.50:1.0, 0.60:1.0, 0.70:1.0, 0.75:1.0, 0.80:1.0, 0.84:1.0, 0.87:1.0, or 0.91:1.0 and independently preferably is not more than, with increasing preference in the order given, 8.0:1.0, 5.0:1.0, 4.0:1.0, 3.5:1.0, 3.0:1.0, 2.5:1.0, 2.2:1.0, 1.9:1.0, 1.6:1.0, 1.3:1.0, 1.10:1.0, 1.00:1.0, 0.95:1.0, or 0.93:1.0. Independently, if component (A) consists solely of nonionic polymers, the molar ratio of $BO_2^{-1}$ to $B_4O_7^{-2}$ in a composition according to the invention preferably is at least, with increasing preference in the order given, 0.090:1.0, 0.150:1.0, 0.20:1.0, 0.30:1.0, 0.40:1.0, 0.50:1.0, 0.60:1.0, 0.70:1.0, 0.75:1.0, 0.80:1.0, 0.86:1.0, 0.89:1.0, or 0.91:1.0 and independently preferably is not more than, with increasing preference in the order given, 12.0:1.0, 9.0:1.0, 6.0:1.0, 4.5:1.0, 3.0:1.0, 2.4:1.0, 1.8:1.0, 1.5:1.0, 1.2:1.0, 1.15:1.0, 1.10:1.0, 1.05:1.0, 1.00:1.0, 0.96:1.0, or 0.92:1.0.

However, when component (B) contains subcomponents (B.1) and (B.2) as defined above and component (A) comprises both subcomponents (A.1) and (A.2) as described above, the molar ratio of (B.1) to (B.2) preferably is at least, with increasing preference in the order given, 0.020:1.0, 0.040:1.0, 0.060:1.0, 0.080:1.0, 0.10:1.0, 0.12:1.0, 0.14:1.0, 0.16:1.0, 0.170:1.0, 0.175:1.0, or 0.180:1.0 and independently preferably is not more than, with increasing preference in the order given, 1.8:1.0, 1.3:1.0, 1.0:1.0, 0.80:1.0, 0.50:1.0, 0.40:1.0, 0.35:1.0, 0.30:1.0, 0.27:1.0, 0.24:1.0, 0.22:1.0, 0.200:1.0, 0.190:1.0, or 0.185:1.0. Independently, when component (A) comprises both subcomponents (A.1) and (A.2) as described above, the molar ratio of $BO_3^{-3}$ to $B_4O_7^{-2}$ in a composition according to the invention preferably is the same as when component (A) includes only nonionic polymers, as set forth in detail above. (For the purposes of calculating all of these molar ratios, a mole is to be considered as the amount required to contain Avogadro's Number, i.e., $6.23 \times 10^{23}$, of anions of the type specified.)

Independently of all other stated preferences, the ratio (by weight) of total component (B), exclusive of any water of hydration, to component (A), measured as non-volatile solids on drying at 100° C. and normal atmospheric pressure, when component (A) is constituted exclusively of nonionic polymers, preferably is at least, with increasing preference in the order given, 0.10:1.0, 0.30:1.0, 0.50:1.0, 0.60:1.0, 0.70:1.0, 0.80:1.0, 0.85:1.0, 0.90:1.0, or 0.95:1.0 and independently preferably is not more than, with increasing preference in the order given, 10:1.0, 8.0:1.0, 6.0:1.0, 5.0:1.0, 4.0:1.0, 3.0:1.0, 2.5:1.0, 2.0:1.0, 1.7:1.0, 1.50:1.0, 1.30:1.0, 1.20:1.0, 1.15:1.0, 1.10:1.0, 1.05:1.0, or 1.00:1.0. If component (A) comprises both subcomponents (A.1) and (A.2) as described above, however, the ratio (by weight) of total component (B), exclusive of any water of hydration, to component (A), measured as non-volatile solids on drying at 100° C. and normal atmospheric pressure, preferably is at least, with increasing preference in the order given, 0.02:1.0, 0.4:1.0, 0.06:1.0, 0.08:1.0, 0.10:1.0, 0.12:1.0, 0.14:1.0, 0.16:1.0, 0.170:1.0, 0.180:1.0, 0.190:1.0, 0.200:1.0, 0.210:1.0, or 0.220:1.0 and independently preferably is not more than, with increasing preference in the order given, 3.0:1.0, 2.0:1.0, 1.5:1.0, 1.0:1.0, 0.80:1.0, 0.60:1.0, 0.40:1.0, 0.32:1.0, 0.28:1.0, 0.250:1.0, 0.240:1.0, 0.230:1.0, or 0.226:1.0.

The function of component (C) is not known in detail, but it has been found to be necessary to the practical success of the invention, presumably because it affects the bulk and/or surface properties of the protective coating formed in some manner that favors facile removal of paint and the protective coating together. This component is preferably selected from substances that are liquids in pure form at 25° C. and normal atmospheric pressure. Independently, at least, with increasing preference in the order given, 20, 35, 50, 60, 65, or 70% of it is a subcomponent (C.1) selected from molecules in which the number ratio of oxygen atoms to carbon atoms is at least, with independent increasing preference in the order given, 0.70:1.0, 0.75:1.0, 0.80:1.0, 0.85:1.0, 0.90:1.0, or 0.95:1.0. Subcomponent (C.1) as thus defined may constitute all of component (C), but if it does not, the remainder of component (C) is designated as subcomponent (C.2), and it is preferably selected from molecules in which the number ratio of oxygen atoms to carbon atoms is from 0.65:1.0 to 0.69:1.0.

Also, independently of any other stated preferences and of one another: each of subcomponents (C.1) and (C.2) if present, independently for each, or the total component (C) if neither of these subcomponents is present, is preferably selected from molecules in which the number of carbon atoms is not greater than, with increasing preference in the order given, 8, 6, 5, 4, or 3 and independently preferably is at least 2 or more preferably at least 3; subcomponent (C.1) preferably constitutes at least, with increasing preference in the order given, 0.5, 1.0, 1.5, 2.0, 2.5, 3.0, 3.5, 4.0, 4.3, 4.6, or 4.9 percent of the total composition and independently preferably constitutes not more than, with increasing preference in the order given, 20, 16, 12, 10, 8.0, 7.5, 7.0, 6.5, 6.0, 5.7, 5.4, or 5.1 percent of the total composition; and both subcomponents (C.1) and (C.2) are present, in a ratio of (C.1):(C.2) that is at least, with increasing preference in the order given, 0.20:1.0, 0.40:1.0, 0.60:1.0, 0.80:1.0, 1.00:1.0, 1.20:1.0, 1.40:1.0, 1.60:1.0, 1.80:1.0, 2.00:1.0, 2.10:1.0, 2.20:1.0, 2.30:1.0, 2.40:1.0, or 2.47:1.0 and independently preferably is not more than 20:1.0, 15:1.0, 10:1.0, 8.0:1.0, 6.0:1.0, 5.0:1.0, 4.0:1.0, 3.6:1.0, 3.3:1.0, 3.0:1.0, 2.80:1.0, 2.70:1.0, 2.60:1.0, or 2.53:1.0.

Among the optional components of a composition according to the invention noted above, only component (D) is normally preferred, and its most preferred embodiment, free boric acid, may well have other film modifying effects that make it useful in addition to its biocidal properties. In any case, a sufficient amount of some biocide to prevent visible growth of microorganisms in a composition according to the invention left open to a normal ambient atmosphere is normally preferred, because deleterious growths, presumably nourished by water soluble polymer component (A) and/or organic component (C) are otherwise likely to occur. An amount of free boric acid that, when nonionic polymers are the only constituent of component (A), has a ratio (by weight) to the total amount of non volatiles at 100° C. and normal atmospheric pressure in components (A) and (C) that is at least, with increasing preference in the order given, 0.004:1.0, 0.006:1.0, 0.008:1.0, 0.010:1.0, 0.015:1.0, 0.020:1.0, 0.025:1.0, 0.030:1.0, 0.035:1.0, 0.040:1.0, or 0.045:1.0 and independently preferably is not more than, with increasing preference in the order given, 0.45:1.0, 0.35:1.0, 0.28:1.0, 0.23:1.0, 0.18:1.0, 0.14:1.0, 0.11:1.0, 0.090:1.0, 0.70:1.0, 0.060:1.0, 0.055:1.0, 0.050:1.0, or 0.048:1.0 is preferred and will, at least in its most preferred amounts, generally have adequate biocidal effect. When component (A) includes both subcomponents (A.1) and (A.2), the preferred amount of free boric acid has a ratio (by weight) to the total amount of non volatiles at 100° C. and normal atmospheric pressure in components (A) and (C) that is at least, with increasing preference in the order given, 0.002:1.0, 0.004:1.0, 0.006:1.0, 0.008:1.0, 0.011:1.0, 0.014:1.0, 0.017:1.0, 0.020:1.0, 0.022:1.0, 0.024:1.0, or 0.026:1.0 and independently preferably is not more than, with increasing preference in the order given, 0.20:1.0, 0.14:1.0, 0.11:1.0, 0.090:1.0, 0.080:1.0, 0.070:1.0, 0.060:1.0, 0.050:1.0, 0.045:1.0, 0.040:1.0, 0.035:1.0, 0.030:1.0, or 0.028:1.0. Again, at least in the most preferred amounts, the free boric acid will normally have an adequate biocidal effect in this type of composition according to the invention. However, even if another biocide is used, as is sometimes preferred, the above stated amounts of free boric acid preferably are still present in a composition according to this invention.

A working composition according to this invention preferably contains the same components that are specified above for concentrate compositions, but in an amount that, for components other than water, is at least, with increasing preference in the order given, 2.0, 2.5, 3.0, 3.5, 4.0, 4.5, or 5.0% of the amount stated above for the same component for a concentrate composition. Ordinarily, the amount of a component other than water in a working composition according to the invention does not, in order to achieve satisfactory results, need to be, and therefore preferably is not, greater than, with increasing preference in the order given, 15, 12, 10, 8, 7.0, 6.5, 6.0, or 5.5% of the value specified above for the same component in a concentrate composition. However, if extraordinarily resistant paints in heavy layers are to be removed, concentrations corresponding to a higher fraction of the above noted values for concentrate compositions may be preferred.

When operating a process according to the invention within a temperature range from 49° to 82° C. to remove, together with a previously applied barrier coating, paint residue accumulations on the barrier coating that are from 25 to 508 micrometers (hereinafter usually abbreviated as "μ") in thickness, by contacting the paint residues with a working composition according to the invention that has a concentration of a preferred concentrate composition according to the invention as described above that is from 5.0 to 25% by volume, it has been found with at least one typical paint that the minimum contact time required to remove the previously applied barrier coating, together with the paint residues on it, can be predicted with fair accuracy by use of the following equation:

$$R = 711 - [3.36] * \{[9/5T_1] + 32\} - 6.80 \cdot P + 0.130 \cdot T_2$$

where: R is the time in seconds required for removing all of the paint residues and the previous barrier coating; T, is the temperature in °C. of the composition according to the invention used during the process; P is the concentration in volume percent, in the working composition, of a preferred concentrate composition as defined above; and $T_2$ is the thickness in μm of the paint residues to be removed. By use of this equation, with knowledge of processing costs for a particular location and operation, processing conditions for the removal of this paint can therefore be economically optimized. With other paints, general trends are expected to be the same although exact coefficients would probably be different. As a generalization, contact times from 1 to 5 minutes are normally used.

Some compositions according to the invention have a tendency to form foams readily; this can be a serious practical disadvantage in use of the compositions, inasmuch as high pressure spraying is the most common commercially practiced method of establishing contact between a paint mask washer composition and a paint mask from which paint residues are to be removed, and the spray nozzles are usually fed from a reservoir into which the liquid runoff from the spraying process is recycled. This mechanical arrangement can cause considerable build-up of foam if the mask washer composition is prone to foaming. Accordingly, many of the working compositions developed during the work that led to this invention were subjected to a foam test procedure, which although it does not directly simulate commercial conditions, has been found by experience to be reliably correlated with foam generation under actual conditions. In this test, 100 milliliters (hereinafter usually abbreviated as "ml") of liquid to be tested was placed in a glass stoppered graduated cylinder with 250 ml capacity and shaken vigorously by hand, then put on a horizontal surface. The initial foam volume was determined by visual observation of the difference between the top of the unfoamed liquid phase and the top of the foam, as soon as the drainage of liquid and foam from the walls of the cylinder was completed (within 15 seconds after completion of shaking). A composition according to the invention preferably generates not more than, with increasing preference in the order given, 30, 27, 24, 21, 18, 16, 14, 12, 10, 8, 6, or 4 ml of foam in this test. If the intended use temperature of the composition is known, foaming according to this test should be determined at that temperature, because temperature often has a strong influence on the amount of foam generated.

Further appreciation of the present invention may be had from considering the following examples and comparison examples which are intended to illustrate, but not to limit, the invention.

EXAMPLES AND COMPARISON EXAMPLES

Concentrates

The active ingredients contained in a number of concentrates, most of which are and some of which may not be according to the invention, are shown in Table 1 below. The balance not shown in all of the compositions in this table was water. The viscosity values shown were measured with a Brookfield viscosimeter, Spindle #4, at 20 revolutions per minute. Ingredients identified in the Table by trademark or other arbitrary designations had the properties noted below:

AQTM NYLON™ P-70 and A-90 were obtained from Toray Industries, Tokyo, and are reported by their supplier to be polymers of adipic acid with hexahydro-2H-azepin-2-one and 1-piperazineethanamine.

CYANAMER™ N-10, N-100L, and P-21 materials were obtained commercially from Cytec Industries. The first two are reported by their supplier to be solutions of 50 to 52% of polyacrylamide in water, with the polyacrylamide having a molecular weight of about 1500 for N-10 and about 10,000 for N-100L.

DOWICIDE™ A Flake antimicrobial was obtained commercially from Van Waters and Rogers, Kirkland, Wash., USA and is reported by its supplier to contain 97% of sodium orthophenylphenate tetrahydrate and 1-2% of sodium hydroxide.

EASTMAN™ AQ 38S and 55S solid water-dispersible polymers were obtained from Eastman Chemicals, Inc.

TABLE 1

| Ingredient | Percent by Weight of Ingredient in Concentrate Number: | | | | | | | |
|---|---|---|---|---|---|---|---|---|
| | 1 | 2 | 3 | 4 | 5 | 6 | 7 | 8 |
| CYANAMER ™ N-100L | 40 | 40 | 50 | 50 | — | — | 50 | 50 |
| CYANAMER ™ P21 | — | — | — | — | 10 | 20 | — | — |
| NaH₂PO₄ | — | — | 5.0 | 5.0 | — | — | — | — |

TABLE 1-continued

| Ingredient | Percent by Weight of Ingredient in Concentrate Number: | | | | | | | |
|---|---|---|---|---|---|---|---|---|
| $Na_2B_4O_7.5 H_2O$ | 10 | 10 | 5.0 | — | — | — | — | — |
| $Na_2CO_3$ | — | 5.0 | — | — | — | — | — | — |
| $NaHCO_3$ | 5.0 | — | — | 5.0 | — | — | — | — |
| $Na_2SiO_3.5 H_2O$ | 1.0 | 1.0 | 1.0 | 1.0 | — | — | 1.0 | 1.0 |
| Glycerine | 5.0 | 5.0 | 5.0 | 2.0 | 5.0 | 2.0 | 5.0 | 2.0 |
| Propylene glycol | 2.0 | 2.0 | 2.0 | 2.0 | 2.0 | 2.0 | 2.0 | 2.0 |
| DOWICIDE ™ A Flakes | 0.1 | 0.1 | 0.1 | 0.1 | 0.1 | 0.1 | 0.1 | 0.1 |
| OTHER PROPERTIES IN COMPOSITION NUMBER | 1 | 2 | 3 | 4 | 5 | 6 | 7 | 8 |
| Viscosity, centipoises | 60 | 120 | 80 | 150 | 430 | $14 \times 10^3$ | 40 | 30 |
| pH | 8.6 | 10.0 | 6.84 | 8.0 | 3.9 | 3.9 | 10.5 | 10.5 |
| Initial Foam Volume, ml, at: | | | | | | | | |
| 25° C. | 6 | 10 | 10 | 18 | 48 | 38 | 10 | 12 |
| 71° C. | 10 | 13 | 18 | 22 | 42 | 42 | 10 | 8 |
| Single Phase Stability? | ½ Sep | ½ Sep | SlSep | ½ Sep | SlPpt | Yes | MdSep | ¼ Sep |
| | 9 | 10 | 11 | 12 | 13 | 14 | 15 | 16 |
| CYANAMER ™ N-100L | 50 | 50 | 50 | 40 | — | — | — | — |
| CYANAMER ™ N-10 | — | — | — | — | 40 | 40 | 40 | 40 |
| $K_4P_2O_7$ | — | — | — | — | 1.0 | 1.0 | 1.0 | 1.0 |
| $Na_2B_4O_7.5 H_2O$ | — | — | — | — | 5.0 | 5.0 | 5.0 | 5.0 |
| 45% KOH in water. | — | — | — | — | — | — | — | — |
| $Na_2CO_3$ | 2.0 | — | — | — | — | — | — | — |
| $NaHCO_3$ | — | 2.0 | — | — | — | — | — | — |
| $Na_2SiO_3.5 H_2O$ | — | — | — | — | — | 1.0 | 1.0 | 1.0 |
| Sodium gluconate | — | — | — | — | — | 2.0 | 2.0 | 2.0 |
| Glycerine | 2.0 | 2.0 | 2.0 | 2.0 | 5.0 | 5.0 | 5.0 | 5.0 |
| Propylene glycol | 2.0 | 2.0 | 2.0 | 1.0 | 5.0 | 2.0 | 2.0 | 2.0 |
| Triethylene glycol | — | — | — | — | — | 2.0 | — | — |
| Dipropylene glycol | — | — | — | — | — | — | 2.0 | — |
| Tripropylene glycol | — | — | — | — | — | — | — | — |
| DOWICIDE ™ A Flakes | 0.1 | 0.1 | 0.1 | 0.1 | 0.1 | 0.1 | 0.1 | |
| OTHER PROPERTIES IN COMPOSITION NUMBER: | 9 | 10 | 11 | 12 | 13 | 14 | 15 | 16 |
| Viscosity, centipoises | 30 | 30 | 20 | 10 | n.e. | n.e. | n.e. | n.m |
| pH | 10.7 | 7.7 | 5.0 | 5.0 | 8.2 | 7.9 | 8.0 | 8.0 |
| Initial Foam Volume, ml, at: | | | | | | | | |
| 25° C. | 20 | 10 | 15 | 16 | n.e. | n.e. | n.e. | n.e. |
| 71° C. | 20 | 10 | 13 | 14 | n.e. | n.e. | n.e. | n.e. |
| Single Phase Stability? | SlFloc | Yes | SlFloc | SlFloc | VSlPpt | VSlPpt | VSlPpt | VSlPpt |
| | 17 | 18 | 19 | 20 | 21 | 22 | 23 | 24 |
| CYANAMER ™ N-10 | 40 | — | — | — | — | — | — | — |
| MAGNIFLOC ™ 581-C | — | 30 | — | — | — | — | — | — |
| POLYMIN ™ P | — | — | 30 | — | — | — | — | — |
| EASTMAN ™ AQ 38S | — | — | — | 15 | — | — | — | — |
| EASTMAN ™ AQ 55S | — | — | — | — | 15 | — | — | — |
| AQ ™ NYLON ™ P-70 | — | — | — | — | — | 15 | — | — |
| AQ ™ NYLON ™ A-90 | — | — | — | — | — | — | 15 | 15 |
| $K_4P_2O_7$ | 1.0 | 1.0 | 1.0 | 1.0 | 1.0 | 1.0 | 1.0 | 1.0 |
| $Na_2B_4O_7.5 H_2O$ | 3.0 | 5.0 | 5.0 | 5.0 | 5.0 | 5.0 | 5.0 | — |
| Sodium gluconate | 2.0 | 2.0 | 2.0 | 2.0 | 2.0 | 2.0 | 2.0 | — |
| Glycerine | 10.0 | 5.0 | 5.0 | 5.0 | 5.0 | 5.0 | 5.0 | 5.0 |
| Propylene glycol | 2.0 | 2.0 | 2.0 | 2.0 | 2.0 | 2.0 | 2.0 | 2.0 |
| DOWICIDE ™ A Flakes | 0.1 | 0.1 | 0.1 | 0.1 | 0.1 | 0.1 | 0.1 | 0.1 |
| OTHER PROPERTIES IN COMPOSITION NUMBER: | 17 | 18 | 19 | 20 | 21 | 22 | 23 | 24 |
| Viscosity, centipoises | n.e. | n.e. | n.e. | n.e. | n.e. | n.e. | n.e. | n.e. |
| pH | 7.2 | 7.3 | 10.4 | n.e. | n.e. | n.e. | n.e. | n.e. |
| Single Phase Stability? | VSlPpt | Yes | Yes | Sldf. | Sldf. | Sep | Sep | Sep |

TABLE 1-continued

| Ingredient | Percent by Weight of Ingredient in Concentrate Number: | | | | | | | |
|---|---|---|---|---|---|---|---|---|
| | 25 | 26 | 27 | 28 | 29 | 30 | 31 | 32 |
| CYANAMER ™ N10 | 30 | 30 | 30 | 30 | 30 | 30 | 30 | 30 |
| NATROSOL ™ 250 JR | — | 0.25 | 0.50 | 1.00 | 2.0 | 1.00 | 1.00 | 1.00 |
| $K_4P_2O_7$ | 5.0 | 2.0 | 5.0 | 5.0 | 5.0 | 7.0 | 10.0 | 7.0 |
| $Na_2B_4O_7.5 H_2O$ | 5.0 | 5.0 | 5.0 | 5.0 | 5.0 | 5.0 | 5.0 | 7.0 |
| 45% KOH in water | 1.0 | 1.0 | 1.0 | 1.0 | 1.0 | 2.0 | 2.0 | 2.0 |
| Glycerine | 5.0 | 5.0 | 5.0 | 5.0 | 5.0 | 5.0 | 5.0 | 5.0 |
| Propylene glycol | 2.0 | 2.0 | 2.0 | 2.0 | 2.0 | 2.0 | 2.0 | 2.0 |
| Boric acid | 2.0 | 2.0 | 2.0 | 2.0 | 2.0 | 2.0 | 2.0 | 2.0 |
| OTHER PROPERTIES IN COMPOSITION NUMBER: | 25 | 26 | 27 | 28 | 29 | 30 | 31 | 32 |
| Viscosity, centipoises | 10 | 20 | 30 | 50 | 200 | 70 | 10 | 70 |
| pH | 8.0 | 7.9 | 8.1 | 8.1 | 8.4 | 8.8 | 9.0 | 8.8 |
| Single Phase Stability? | Yes | Yes | Yes | Yes | Yes | Yes | MdSep | MdSep |

| | 33 | 34 | 35 | 36 | 37 | 38 | 39 | 40 |
|---|---|---|---|---|---|---|---|---|
| CYANAMER ™ N10 | 30 | 30 | 30 | 50 | 50 | — | — | 70 |
| CYANAMER ™ N-100L | — | — | — | — | — | 50 | 50 | — |
| NATROSOL ™ 250 JR | 2.00 | — | — | — | — | — | — | — |
| $K_4P_2O_7$ | 7.0 | 7.0 | 10.0 | — | — | — | — | — |
| $Na_2B_4O_7.5 H_2O$ | 5.0 | 7.0 | 5.0 | — | 2.0 | 2.0 | — | — |
| 45% KOH in water | 2.0 | 2.0 | 2.0 | — | — | — | — | — |
| $Na_2CO_3$ | — | — | — | — | 2.0 | 2.0 | 2.0 | 2.0 |
| $NaHCO_3$ | — | — | — | 5.0 | — | — | 2.0 | — |
| $Na_2SiO_3.5 H_2O$ | — | — | — | 0.50 | 0.50 | — | — | — |
| Sodium gluconate | — | — | — | — | — | — | — | — |
| Glycerine | 5.0 | 5.0 | 5.0 | 5.0 | 2.0 | 2.0 | 2.0 | 2.0 |
| Propylene glycol | 2.0 | 2.0 | 2.0 | 2.0 | 1.0 | 2.0 | 2.0 | 2.0 |
| Boric acid | 2.0 | 2.0 | 2.0 | — | — | — | — | — |
| DOWICIDE ™ A Flakes | — | — | — | — | — | — | — | 0.10 |
| OTHER PROPERTIES IN COMPOSITION NUMBER: | 33 | 34 | 35 | 36 | 37 | 33 | 39 | 40 |
| Viscosity, centipoises | 90 | 10 | 10 | 10 | 10 | 20 | 20 | 10 |
| pH | 8.9 | 9.0 | 9.0 | 8.4 | 9.6 | 9.6 | 9.6 | 9.7 |
| Initial Foam Volume, ml, at: | | | | | | | | |
| 25° C. | n.e. | n.e. | n.e. | 24 | 17 | 24 | 20 | 24 |
| 71° C. | n.e. | n.e | n.e. | 18 | 12 | 13 | 17 | 16 |
| Single Phase Stability? | MdSep | SlSep | Yes | ½ Sep | ½ Sep. | Yes | Yes | Yes |

| | 41 | 42 | 43 | 44 | 45 | 46 | 47 | 48 |
|---|---|---|---|---|---|---|---|---|
| CYANAMER ™ N10 | 70 | — | — | 40 | 40 | — | — | 30 |
| CYANAMER ™ N-100L | — | 70 | 70 | — | — | 50 | 50 | — |
| $K_4P_2O_7$ | — | — | — | — | — | — | — | 2.0 |
| $Na_2B_4O_7.5 H_2O$ | — | — | 2.0 | — | — | 2.0 | 2.0 | 5.0 |
| $Na_2CO_3$ | 2.0 | — | — | — | — | 2.0 | 2.0 | — |
| $NaHCO_3$ | — | 1.0 | 1.0 | 1.0 | 1.0 | — | — | — |
| Sodium gluconate | — | — | — | — | — | — | — | 2.0 |
| Triethanolamine | — | 2.0 | 2.0 | 2.0 | 2.0 | — | — | — |
| Glycerine | 5.0 | 2.0 | 2.0 | 2.0 | 2.0 | 5.0 | 2.0 | 10.0 |
| Propylene glycol | 2.0 | 2.0 | — | 2.0 | — | 2.0 | 5.0 | 2.0 |
| POLY GLYCOL ™ P1200 | — | — | — | — | — | — | — | 0.20 |
| POLY GLYCOL ™ E-400 | — | — | 2.0 | — | 2.0 | — | — | — |
| DOWICIDE ™ A Flakes | 0.10 | 0.10 | 0.10 | 0.10 | 0.10 | 0.10 | 0.10 | 0.10 |
| OTHER PROPERTIES IN COMPOSITION NUMBER: | 41 | 42 | 43 | 44 | 45 | 46 | 47 | 48 |
| Viscosity, centipoises | 10 | 110 | 100 | n.e. | n.e. | 30 | 30 | 10 |
| pH | 9.7 | 8.7 | 8.6 | 8.5 | 8.5 | 9.3 | 9.4 | 7.7 |
| Initial Foam Volume, ml, at: | | | | | | | | |
| 25° C. | 32 | 12 | 18 | 12 | 23 | 10 | 20 | 10 |
| 71° C. | 24 | 10 | 42 | 10 | 28 | 8 | 14 | 10 |
| Single Phase Stability? | SlPpt | Yes | Yes | VSlPpt | SlPpt | Yes | Yes | SlSep |

TABLE 1-continued

| Ingredient | Percent by Weight of Ingredient in Concentrate Number: | | | | | | | |
|---|---|---|---|---|---|---|---|---|
| | 49 | 50 | 51 | 52 | 53 | 54 | 55 | 56 |
| CYANAMER ™ N10 | 30 | 30 | 30 | 25 | 25 | 40 | 40 | 30 |
| $K_4P_2O_7$ | 5.0 | 2.0 | 5.0 | 5.0 | 10.0 | 2.0 | 1.0 | 2.0 |
| $Na_2B_4O_7.5 H_2O$ | 5.0 | 5.0 | 5.0 | 5.0 | 2.0 | 5.0 | 5.0 | 2.5 |
| Sodium gluconate | 2.0 | 2.0 | 2.0 | 2.0 | 2.0 | 2.0 | 2.0 | 2.0 |
| Sodium sulfate | — | — | — | 2.0 | — | — | — | — |
| Triethanolamine | — | — | — | — | — | 1.0 | 1.0 | 2.0 |
| Glycerine | 10.0 | 5.0 | 5.0 | 5.0 | 5.0 | 5.0 | 5.0 | 5.0 |
| Propylene glycol | 2.0 | 2.0 | 2.0 | 2.0 | 2.0 | 2.0 | 2.0 | 2.0 |
| POLY GLYCOL ™ P1200 | 0.20 | 0.20 | 0.20 | — | — | — | — | — |
| DOWICIDE ™ A Flakes | 0.10 | 0.10 | 0.10 | 0.10 | 0.10 | 0.10 | 0.10 | 0.10 |
| OTHER PROPERTIES IN COMPOSITION NUMBER: | 49 | 50 | 51 | 52 | 53 | 54 | 55 | 56 |
| Viscosity, centipoises | 10 | 10 | 10 | 10 | 10 | 10 | n.e. | n.e. |
| pH | 7.9 | 8.1 | 8.3 | 8.3 | 8.4 | 8.6 | 8.4 | 9.2 |
| Initial Foam Volume, ml, at: | | | | | | | | |
| 25° C. | 20 | 13 | 18 | n.e. | n.e. | n.e. | n.e. | n.e. |
| 71° C. | 12 | 20 | 20 | n.e. | n.e. | n.e. | n.e. | n.e. |
| Single Phase Stability? | SlSep | SlSep | SlSep | VSlPpt | n.e. | n.e. | n.e. | n.e. |

| | 57 | 58 | 59 | 60 | 61 | 62 | 63 | 64 |
|---|---|---|---|---|---|---|---|---|
| CYANAMER ™ N10 | 30 | 30 | 40 | 20 | — | — | 39.5 | 39.5 |
| SANFLOC ™ C-711P | — | — | — | — | — | — | — | 0.5 |
| MAGNIFLOC ™ 577-C | — | — | — | 2.0 | 40 | — | — | — |
| POLYMIN ™ P | — | — | — | — | — | 40 | — | — |
| $K_4P_2O_7$ | 5.0 | — | 1.0 | 2.0 | 2.0 | 2.0 | 2.0 | 2.0 |
| $Na_2B_4O_7.5 H_2O$ | 2.5 | 10.0 | 5.0 | 5.0 | 5.0 | 5.0 | 5.0 | 5.0 |
| 45% KOH in water | — | — | — | 2.0 | — | — | — | — |
| Sodium gluconate | 2.0 | 2.0 | — | — | — | — | — | — |
| Triethanolamine | 2.0 | — | — | — | — | — | — | — |
| Glycerine | 5.0 | 5.0 | 7.5 | 5.0 | 5.0 | 5.0 | 5.0 | 5.0 |
| Propylene glycol | 2.0 | 2.0 | 3.5 | 2.0 | 2.0 | 2.0 | 2.0 | 2.0 |
| DOWICIDE ™ A Flakes | 0.10 | 0.10 | 0.10 | 0.10 | 0.10 | 0.10 | 0.10 | 0.10 |
| OTHER PROPERTIES IN COMPOSITION NUMBER: | 57 | 58 | 59 | 60 | 61 | 62 | 63 | 64 |
| Viscosity, centipoises | n.e. | n.e. | n.e. | 20 | 30 | 40 | n.e. | <0.05 |
| pH | 9.4 | n.e. | 7.8 | 8.2 | 7.4 | 10.5 | n.e. | 8.5 |
| Single Phase Stability? | n.e. | n.e. | n.e. | Yes | Yes | SlPpt | n.e. | Floc. |

| | 65 | 66 | 67 | 68 | 69 | 70 | 71 | 72 |
|---|---|---|---|---|---|---|---|---|
| CYANAMER ™ N10 | 39.5 | 39.5 | 39.0 | 39.0 | 39.0 | — | — | — |
| MAGNIFLOC ™ 905N | 0.5 | — | — | — | — | — | — | — |
| MAGNIFLOC ™ 492-C | — | 0.5 | — | — | — | — | — | — |
| MAGNIFLOC ™ 592-C | — | — | 1.0 | — | — | — | — | — |
| MAGNIFLOC ™ 577-C | — | — | — | 1.0 | — | 40 | 40 | 40 |
| POLYMIN ™ P | — | — | — | — | 1.0 | — | — | — |
| $K_4P_2O_7$ | 2.0 | 2.0 | 2.0 | 2.0 | 2.0 | 2.0 | 2.0 | 5.0 |
| $Na_2B_4O_7.5 H_2O$ | 5.0 | 5.0 | 5.0 | 5.0 | 5.0 | 5.0 | 5.0 | 5.0 |
| 45% KOH in water | — | — | — | — | — | 1.0 | 2.0 | 2.0 |
| Glycerine | 5.0 | 5.0 | 5.0 | 5.0 | 5.0 | 5.0 | 5.0 | 5.0 |
| Propylene glycol | 2.0 | 2.0 | 2.0 | 2.0 | 2.0 | 2.0 | 2.0 | 2.0 |
| Boric acid | — | — | — | — | — | 2.0 | 2.0 | 2.0 |
| DOWICIDE ™ A Flakes | 0.10 | 0.10 | 0.10 | 0.10 | 0.10 | 0.10 | 0.10 | 0.10 |
| OTHER PROPERTIES IN COMPOSITION NUMBER: | 65 | 66 | 67 | 68 | 69 | 70 | 71 | 72 |
| Viscosity, centipoises | 280 | 30 | <0.05 | 20 | 20 | 60 | 20 | 35 |
| pH | 8.5 | 8.5 | 8.5 | 8.5 | 9.0 | 7.3 | 7.7 | 8.2 |
| Single Phase Stability? | Yes | Yes | Yes | Yes | Yes | Yes | Yes | Yes |

| | 73 | 74 | 75 | 76 | 77 | 78 | 79 | 80 |
|---|---|---|---|---|---|---|---|---|
| CYANAMER ™ N10 | — | — | — | 70 | 70 | 70 | 50 | 30 |
| CYANAMER ™ N-100L | — | 50 | 50 | — | — | — | — | — |
| MAGNIFLOC ™ 577-C | 60 | — | — | — | — | — | — | — |
| $K_4P_2O_7$ | 5.0 | — | — | — | — | 1.0 | 1.0 | 1.0 |
| $Na_2B_4O_7.5H_2O$ | 5.0 | — | — | — | — | 2.0 | 2.0 | 5.0 |

TABLE 1-continued

| Ingredient | Percent by Weight of Ingredient in Concentrate Number: | | | | | | | |
|---|---|---|---|---|---|---|---|---|
| 45% KOH in water | 2.0 | — | — | — | — | — | — | — |
| Boric acid | 2.0 | — | — | — | — | — | — | — |
| NaHCO₃ | — | 5.0 | 5.0 | 2.0 | 2.0 | — | — | — |
| Sodium gluconate | — | 5.0 | — | 2.0 | 2.0 | 2.0 | 2.0 | 2.0 |
| Triethanolamine | — | 2.0 | 2.0 | — | — | — | — | — |
| Glycerine | 5.0 | 5.0 | 5.0 | 5.0 | 2.0 | 5.0 | 5.0 | 5.0 |
| Propylene glycol | 2.0 | 2.0 | 2.0 | 2.0 | 5.0 | — | — | 2.0 |
| POLY GLYCOL ™ P1200 | — | — | — | — | — | 1.0 | 1.0 | — |
| DOWICIDE ™ A Flakes | 0.10 | 0.10 | 0.10 | 0.10 | 0.10 | 0.10 | 0.10 | 0.10 |

| OTHER PROPERTIES IN COMPOSITION NUMBER: | 73 | 74 | 75 | 76 | 77 | 78 | 79 | 80 |
|---|---|---|---|---|---|---|---|---|
| Viscosity, centipoises | 180 | 70 | 50 | 35 | 40 | 50 | 20 | 10 |
| pH | 7.9 | 8.7 | 8.7 | 7.8 | 7.3 | 7.5 | 7.7 | 8.0 |
| Initial Foam Volume, ml, at: | | | | | | | | |
| 25° C. | n.e. | 10 | 10 | 12 | 22 | 7 | 7 | 12 |
| 71° C. | n.e. | 20 | 8 | 16 | 37 | 3 | 3 | 10 |
| Single Phase Stability? | Yes | SlPpt | VSlPpt | Yes | Yes | SlPpt | VSlPpt | VSlPpt |

| | 81 | 82 | 83 | 84 | 85 | 86 | 87 | 88 |
|---|---|---|---|---|---|---|---|---|
| CYANAMER ™ N10 | 30 | 20 | 20 | 30 | 30 | 20 | 20 | 10 |
| MAGNIFLOC ™ 581-C | — | — | — | — | — | 20 | — | 20 |
| POLYMIN ™ P | — | — | — | — | - | — | 20 | — |
| K₄P₂O₇ | 2.0 | 1.0 | 2.0 | 1.0 | 1.0 | 1.0 | 1.0 | 1.0 |
| Na₂B₄O₇.5 H₂O | 2.0 | 5.0 | 2.0 | 5.0 | 10.0 | 5.0 | 5.0 | 5.0 |
| NaHCO₃ | 2.0 | — | 2.0 | — | — | — | — | — |
| Sodium gluconate | 2.0 | 2.0 | 2.0 | 2.0 | 2.0 | 2.0 | 2.0 | 2.0 |
| Glycerine | 5.0 | 5.0 | 5.0 | 10.0 | 5.0 | 5.0 | 5.0 | 5.0 |
| Propylene glycol | 2.0 | 2.0 | 2.0 | 2.0 | 2.0 | 2.0 | 2.0 | 2.0 |
| DOWICIDE ™ A Flakes | 0.10 | 0.10 | 0.10 | 0.10 | 0.10 | 0.10 | 0.10 | 0.10 |

| OTHER PROPERTIES IN COMPOSITION NUMBER: | 81 | 82 | 83 | 84 | 85 | 86 | 87 | 88 |
|---|---|---|---|---|---|---|---|---|
| Viscosity, centipoises | 10 | 10 | 10 | 10 | 10 | 105 | 115 | 65 |
| pH | 7.9 | 8.1 | 7.9 | 7.6 | 8.4 | 7.4 | 10.1 | 7.5 |
| Initial Foam Volume, ml, at: | | | | | | | | |
| 25° C. | 10 | 14 | 14 | 22 | n.e. | n.e. | n.e. | n.e. |
| 71° C. | 10 | 20 | 20 | 20 | n.e. | n.e. | n.e. | n.e. |
| Single Phase Stability? | SlPpt | VSlPpt | VSlPpt | Yes | Ppt | Yes | Yes | Yes |

| | 89 | 90 | 91 | 92 | 93 | 94 | 95 | 96 |
|---|---|---|---|---|---|---|---|---|
| CYANAMER ™ N10 | 20 | 30 | 20 | 30 | 40 | 40 | 40 | 40 |
| MAGNIFLOC ™ 577-C | 20 | 10 | 20 | 10 | 20 | 20 | 15 | 10 |
| 45% KOH in water | 2.0 | 2.0 | 2.0 | 2.0 | 2.0 | 2.0 | 2.0 | 2.0 |
| K₄P₂O₇ | 2.0 | 2.0 | 5.0 | 5.0 | 2.0 | 2.0 | 2.0 | 2.0 |
| Na₂B₄O₇.5 H₂O | 5.0 | 5.0 | 5.0 | 5.0 | 5.0 | 5.0 | 5.0 | 5.0 |
| Boric acid | 2.0 | 2.0 | 2.0 | 2.0 | 2.0 | 2.0 | 2.0 | 2.0 |
| Glycerine | 5.0 | 5.0 | 5.0 | 10.0 | 5.0 | 5.0 | 5.0 | 5.0 |
| Propylene glycol | 2.0 | 2.0 | 2.0 | 2.0 | 2.0 | 2.0 | 2.0 | 2.0 |
| DOWICIDE ™ A Flakes | 0.10 | 0.10 | 0.10 | 0.10 | 0.10 | — | — | — |

| OTHER PROPERTIES IN COMPOSITION NUMBER: | 89 | 90 | 91 | 92 | 93 | 94 | 95 | 96 |
|---|---|---|---|---|---|---|---|---|
| Viscosity, centipoises | 20 | 20 | 20 | 40 | 80 | 80 | 70 | 50 |
| pH | 8.2 | 8.4 | 8.5 | 8.6 | 9.2 | 8.0 | 8.2 | 8.3 |
| Initial Foam Volume, ml, at: | | | | | | | | |
| 25° C. | n e | n e | n.e. | n.e. | n.e. | n.e. | n.e. | n.e. |
| 71° C. | n e | n e | n.e. | n.e. | n.e. | n.e. | n.e. | n.e. |
| Single Phase Stability? | Yes | Yes | Yes | Yes | Yes | Yes | Yes | Yes |

| | 97 | 98 | 99 | 100 | 101 | 102 | 103 | 104 |
|---|---|---|---|---|---|---|---|---|
| CYANAMER ™ N10 | 10 | 30 | 30 | 30 | 30 | 30 | 30 | 20 |
| POLYMIN ™ P | 20 | 5.0 | 5.0 | 5.0 | 5.0 | — | — | — |
| K₄P₂O₇ | 1.0 | 1.0 | 1.0 | 1.0 | 1.0 | 1.0 | 1.0 | 3.0 |
| Na₂B₄O₇.5 H₂O | 5.0 | 5.0 | 5.0 | 5.0 | 5.0 | 7.0 | 9.0 | 7.0 |
| Sodium gluconate | 2.0 | 2.0 | 2.0 | 2.0 | 2.0 | 2.0 | 2.0 | — |
| Glycerine | 5.0 | 10.0 | 5.0 | 10.0 | 5.0 | 5.0 | 5.0 | 5.0 |

TABLE 1-continued

| Ingredient | Percent by Weight of Ingredient in Concentrate Number: | | | | | | | |
|---|---|---|---|---|---|---|---|---|
| Propylene glycol | 2 0 | 2 0 | 2.0 | 2.0 | 2.0 | 2.0 | 2.0 | 3.0 |
| SURFYNOL ™ 104E | — | — | — | 0.10 | 0.10 | — | — | — |
| DOWICIDE ™ A Flakes | 0 10 | — | — | — | — | — | — | — |
| OTHER PROPERTIES IN COMPOSITION NUMBER: | 97 | 98 | 99 | 100 | 101 | 102 | 103 | 104 |
| Viscosity, centipoises | 40 | 40 | 40 | 20 | 20 | 10 | 14 | n.e. |
| pH | 10.1 | 8.6 | 9.2 | 8.8 | 9.2 | 7.9 | 8.1 | n.e. |
| Single Phase Stability? | Yes | Yes | Yes | Yes | Yes | Yes | SlCry | n.e. |

Abbreviations in Table 1

"Sep" means "Separated into two or more liquid phases", if a fraction precedes this abbreviation, it means that the second larger of the phases had about this fraction of the volume of total composition. "SlSep" means "Slightly separated into two or more liquid phases, with the second larger of the phases having not more than one-eighth of the volume of the total composition. "SlPpt" means "Slight precipitate that occupied not more than one-eighth of the total volume was observed". "MdSep" means "Moderately separated into two or more liquid phases, with the second larger phase occupying from about one-eighth to about one-quarter of the total volume of the composition". "SlFloc" means "Slight floc, visually estimated to occupy no more than one-eighth of the total volume of the composition, was observed, but did not settle rapidly, and no second liquid phase was observed". "VSlPpt" means "Very slight precipitation, visually estimated to occupy no more than one-fifteenth of the volume of the total composition, was observed, but no second liquid phase was observed".
"n.e." means "not evaluated". "Sldf." means "Solidification of entire composition observed."
"Floc." means "Flocculation, with the floc visually estimated to occupy more than one-eighth of the total volume of the composition".
"SlCry" means "Slight crystaliazation", i.e., crystals, visually estimated to occupy less than one-eighth of the total volume of the composition, formed and settled, but there was no second liquid phase.

MAGNIFLOC™ 492-C, 577-C, 581-C, 592-C, and 905-N were all obtained commercially from Cytec Industries, Inc. and are all reported by their supplier to be solutions of 49–51% in water of cationic polymers, some of which are quaternized polyacrylamide and others of which are polymers of epichlorohydrin, ethylene diamine, and dimethylamine.

NATROSOL™ JR hydroxyethylcellulose was obtained commercially from Aqualon, a division of Hercules, Inc., in Wilmington, Del., U.S.A.

POLYGLYCOL™ P-1200 and E-400 were obtained from Dow Chemicals US and are reported by their supplier to be poly{ethylene glycol}'s with molecular weights of about 1200 and about 400 respectively.

POLYMIN™ P was obtained from BASF and is reported by its supplier to be a 50% aqueous solution of a homopolymer of ethyleneimine.

SANFLOC™ C-71 1P was obtained commercially from Sanyo Chemical Industries, Ltd., Tokyo and is reported by its supplier to be "cationic polyacrylamide".

SURFYNOL™ 104E was obtained commercially from Air Products and Chemicals, Inc., Allentown, Pa. and is reported by its supplier to consist of 50% of 2,4,7,9-tetramethyl-5-decyne-4,7-diol and 50% of ethylene glycol.

Working Compositions and Processes

Group 1

Candidate working compositions were made from Concentrate Nos. 1–12, 36–51, and 74–84 by diluting portions of these concentrates with deionized water to form a solution containing 10% of the concentrate. These candidate working compositions were tested for foam generation by the method of shaking in a stoppered graduated cylinder described above. Results are in Table 1; the last digits of these results are probably accurate within ±2 only.

Group 2

In this group, working compositions were prepared and tested for paint removal is and barrier coating formation effectiveness on test panels of cold rolled steel. These were first immersed in baths containing the diluted concentrates at a level to give 4.0% total solids in the working compositions; these baths were maintained at 71° C. during the immersion of the test panels therein. Panels were then removed, with no deliberate attempt to facilitate the drainage of liquid from their surfaces, and hung in the ambient air until dry. The quality of film coverage was evaluated at this point. Then the panels were spray painted with solvent based KRYLON™ epoxy paint and allowed to dry. Next they were either (i) rinsed with tap water at 60° C. (designated "x") or (ii) re-immersed in the mask washing composition bath at 71° C. for 3 minutes, removed and quickly rinsed with tap water at 60° C. (designated "2x"); in either instance, the quality of paint removal was evaluated. These results are shown in Table 2 below.

Group 3

In this group, the paint removal and coating reformation process was designed to simulate commercial use more closely than the immersion method of Group 2. For this test, two V-JET™ Model 5070 spray nozzles were mounted about 20 centimeters above a platform on which test specimens could be placed for coating and for performance tests. The spray nozzles were supplied with mask washing composition at a net pressure of 0.86 bar. The mask washer contained a total of 4 liters of mask washer composition,

TABLE 2

| No. | Coverage Evaluation | Removal Characterization | | |
|-----|---------------------|------|-----|----------|
|     |                     | MtR  | %   | Comments |
| 5   | "fish eyes" in coating, long dry time, drip marks, flash rust | x | 90 | easy removal, large pieces |
| 6   | some "fish eyes" in coating, drip marks, but good coverage | x | 10 | difficult removal, moderate sized pieces |
| 9   | coating pulled away from edges, otherwise good coverage | x | 50 | difficult removal, small pieces |
| 10  | good coverage | x | 75 | difficult removal |
| 11  | "fish eyes" in coating, coating pulled away from edges | x | 5 | very difficult removal, small pieces |
| 12  | some "fish eyes" in coating, coating pulled away from edges, otherwise good coverage | x | 20 | very difficult removal, small sticky pieces |
| 13  | coating strongly pulled away from edges, no "fish eyes" in coating, streaky appearance | x | 95 | moderate removal time, large pieces |
|     |  | 2x | 100 | moderate removal time, large pieces |
| 14  | coating slightly pulled away from edges, no "fish eyes" in coating, slightly streaky appearance | x | 90 | long removal time, moderate sized pieces |
|     |  | 2x | 95 | long removal time, moderate sized pieces |
| 15  | coating slightly pulled away from edges, no "fish eyes" in coating, otherwise good coverage | x | 90 | short removal time, medium to large pieces |
|     |  | 2x | 95 | short removal time, medium to large pieces |
| 16  | coating strongly pulled away from edges, no "fish eyes" in coating | x | 75 | long removal time, paint sticking to void coverage areas |
|     |  | 2x | 85 | long removal time, paint sticking to void coverage areas |
| 17  | good wetting and coverage, no "fish eyes" in coating | x | 95 | long removal time, paint sticking to void coverage areas |
|     |  | 2x | 60 | long removal time, paint sticking to void coverage areas |
| 18  | good coverage, coating pulled away very slightly from edges | 2x | 100 | moderate removal time, medium to large pieces |
| 19  | very good coverage, no "fish eyes" in coating | 2x | 100 | short removal time, very large pieces |
| 38  | "fish eyes" in coating, otherwise good coverage | x | 40 | difficult removal, small pieces |
| 39  | "fish eyes" in coating, coating pulled away from edges | x | 30 | difficult removal, small pieces |
| 40  | "fish eyes" in coating, coating pulled away from edges | x | 60 | moderately easy removal, small pieces |
| 41  | small portion of coating pulled away from edges, otherwise good coverage | x | 98 | short removal time, large pieces |
| 42  | small portion of coating pulled away from edges, otherwise good coverage | x | 60 | long removal time, moderate sized pieces |
| 43  | coating pulled away from edges | x | 60 | difficult removal, moderate sized pieces |
| 44  | coating pulled away from edges, large portion of surface not covered | x | 1 | very difficult removal |
| 45  | small portion of coating pulled away from edges, otherwise good coverage | x | 15 | difficult removal, small pieces |
| 46  | coating pulled away from edges | x | 1 | difficult removal, small pieces |
| 47  | coating pulled away from edges, large portion of surface not covered | x | <1 | very difficult removal |
| 48  | "fish eyes" in coating, drip marks, uneven coverage | x | 95 | long removal time, moderate sized pieces |
|     |  | 2x | 80 | long removal time, moderate sized pieces |
| 49  | "fish eyes" in coating, uneven coverage | x | 90 | long removal time, small pieces |
|     |  | 2x | 95 | medium to large pieces |
| 50  | "fish eyes" in coating | x | 30 | small to medium pieces |
|     |  | 2x | 98 | long removal time, large pieces |
| 51  | good coverage | x | 90 | long removal time, moderate sized pieces |
|     |  | 2x | 100 | long removal time, large pieces |
| 59  | coating pulled away from edges, no "fish eyes" in coating | x | 98 | long removal time, large pieces |
|     |  | 2x | 98 | long removal time, large pieces |
| 74  | coating pulled away from edges, large portion of surface not covered | x | 30 | difficult removal, moderate sized pieces |
| 75  | "fish eyes" in coating, coating pulled away from edges, large portion of surface not covered | x | 5 | difficult removal, small pieces |
| 76  | coating pulled away from edges | x | 40 | difficult removal, moderate sized pieces |
| 77  | coating pulled away from edges so strongly that little coverage was achieved | x | 30 | difficult removal, small pieces |
| 78  | drip marks, uneven coverage, "fish eyes" in | x | 5 | very difficult removal, small |

TABLE 2-continued

| No. | Coverage Evaluation | Removal Characterization | | |
|---|---|---|---|---|
| | | MtR | % | Comments |
| | coating | | | pieces |
| 79 | drip marks, uneven coverage, "fish eyes" in coating | x | 75 | difficult removal, small pieces |
| 80 | good coverage and wetting | x | 98 | moderate removal time, small pieces |
| 81 | "fish eyes" in coating | x | 98 | moderately short removal time, large pieces |
| 82 | small portion of coating pulled away from edges | x | 100 | very short removal time, single piece |
| 83 | good coverage | x | 75 | difficult removal, large pieces |
| 84 | coating pulled away from edges | x | 95 | short removal time, small pieces |
| | | 2x | 98 | long removal time, large pieces |
| 86 | very good even coverage, coating pulled away very slightly from edges, very slight rusting | x | 99 | short removal time, paint sticking to rusted spots |
| | | 2x | 95 | short removal time, paint sticking to rusted spots |
| 87 | very good even coverage, coating pulled away very slightly from edges | x | 98 | moderate removal time |
| | | 2x | 95 | long removal time |
| 88 | very good even coverage, coating pulled away very slightly from edges | x | 98 | slight sticking on edges only |
| | | 2x | 95 | slight sticking on edges only |
| 89 | very good even coverage, coating pulled away very slightly from edges | x | 85 | very long removal time |
| | | 2x | 85 | very long removal time |
| 90 | poor film formation, coating pulled away from edges, breaking and draining left large void areas in coverage | x | 60 | moderately fast removal from coated part of panel, no removal otherwise |
| | | 2x | 60 | same as with method "x" |
| 91 | poor film formation, coating pulled away from edges, breaking and draining left large void areas in coverage | x | 70 | slow removal from coated part, no removal otherwise |
| | | 2x | 85 | fast removal from coated part, little or no removal otherwise |
| 92 | poor coverage with void areas, pulling and breaking of film | x | 60 | slow, incomplete removal |
| | | 2x | 95 | fast, almost complete removal |
| 93 | excellent coverage, no "fish eyes" in coating, breaking, pulling, or streaking of film | x | 99 | slow, removal |
| | | | 2x | 100 | fast removal |

Abbreviations in Table 2
"No." means "Number"; "MtR" means "Method for Removal"; "%" means "percent of coating removed".

which could be heated to a controlled temperature up to about 88° C. Test substrates were coated with working paint washer composition in this apparatus, then removed and allowed to dry, so that an initial barrier coating was formed. These barrier coated substrates were then coated with a solvent-borne BASF black paint actually used for pattern formation with paint masks in commercial practice. The paint coated masks were then subjected to 2.0 minutes of spraying as described above, with the temperature of the paint mask washer composition being maintained at 71° C. during the spraying. Results are shown in Table 3. Lines in this table in which none of the first four columns change from their previous values are replications with different individual substrates of the same type.

Group 4

This was substantially the same as Group 3, except that (i) an Akzo catalyzed water-based paint and only flat stainless steel substrates were used, and (ii) the working composition was a mixture of 500 ml of Concentrate #60 (from Table 1) mixed with 4500 ml of deionized water. The amounts of paint and drying time were varied as shown below.

4.1. Normal paint applied, dried 5 minutes—paint was removed by 45 seconds of spray with fresh working composition.

4.2. Normal paint applied, dried 20 minutes—paint was removed by 45 seconds of spray with fresh working composition.

4.3. Normal paint applied, dried 30 minutes—paint was removed by 2 minutes of spray with fresh working composition, with panel reversed after 1 minute.

4.4. Heavy paint applied, dried 20 minutes—paint was removed by 45 seconds of spray with fresh working composition.

TABLE 3

| Washer Composition Characteristics | | | | Process Characteristics | | | |
|---|---|---|---|---|---|---|---|
| Cn # | % Cn | pH | Sub-strate | % Rem | Removal Comments | FoBd | PaDeCom |
| 80 | 15 | 8.9 | CRS | 99 | very good and fast removal | low | small paint particles floating |
| | | | | 100 | very good and fast removal | low | paint breaking up and floating |
| | | | | 98 | very good and fast removal | low | small paint clumps floating |
| | 20 | 8.4 | CRS | 99 | remaining paint on top edge of panel only | low | n.e. |
| | | | | 95 | remaining paint on top edge of panel only | low | n.e. |
| | | | | 99 | remaining paint on top edge of panel only | low | paint floating and collecting in clumps |
| | 20 | 8.6 | CRS | 99 | excellent removal, patchy recoat | low | floating clumps of paint, not sticking to walls |
| | | | | 99 | excellent removal, good recoat | low | n.e. |
| | | | | 98 | excellent removal, good recoat | low | n.e. |
| | | | | 100 | excellent removal, good recoat | low | n.e. |
| | | | CRS | 99 | excellent removal, good recoat | low | little to no paint adhering to walls |
| | | | SSf | 99 | excellent removal, good recoat | low | paint collecting in clumps |
| | | | | 99 | excellent removal, good recoat | low | away from the walls. |
| 30 | 20 | n.e. | SSf | 100 | excellent, very fast removal | mod. | paint dispersing, attaching to walls |
| | | | | 100 | excellent, very fast removal | mod. | paint dispersing, attaching to walls |
| | | | | 100 | excellent, very fast removal | mod. | n.e. |
| | | | SSr | 96 | remaining paint in recesses only | mod | n.e |
| | | | | 99 | remaining paint in recesses only | mod | paint dispersing, attaching to walls |
| | | | SSf | 100 | complete removal in 20 seconds | mod | n.e. |
| | | | | 99 | very fast removal | mod | n.e. |
| 30 | 20 | n.e. | SSf | 100 | very fast removal | mod | paint dispersing on foam |
| | | | | 100 | very fast removal | mod | bubbles and sticking |
| | | | SSr | 98 | remaining paint in recesses only | mod | sides of tank, not clumping |
| | | | | 98 | remaining paint in recesses only | mod | together as with compositions made with Concentrate 80 |
| 35 | 10 | n.e. | SSf | 100 | complete removal in 15 seconds | low | paint was floating and |
| | | | | 100 | complete removal in 15 seconds | low | coalescing into a blob that |
| | | | | 100 | complete removal in 15 seconds | low | did not attach to the walls |
| | | | | 100 | complete removal in 15 seconds | low | but was slightly slippery to |
| | | | SSr | 98 | remaining paint in recesses only | low | the touch |
| | | | | 98 | remaining paint in recesses only | low | |

Abbreviations in Table 3
"Cn #" means "Concentrate number (from Table 1); "% Cn" means "percent of concentrate in working composition; "% Rem" means "percent of paint removed"; "FoBd" means "degree off foam build-up", a rating of "low" being fully commercially acceptable and a rating of "mod" being sometimes commercially acceptable; "PaDeCom" means "Paint detackification comments"; "CRS" means "a flat cold rolled steel substrate"; "SSf" means "a flat stainless steel substrate; "SSr" means "a stainless steel substrate including recesses".

4.5. Heavy paint applied, dried 30 minutes—paint was removed by 2 minutes of spray with fresh working composition, with panel reversed after 1 minute.

Group 5

This group was substantially the same as for individual members of Group 2 with "Method 2x", except that: (i) All of the substrates were first immersed for 3 minutes in the working composition, then removed and air dried to form a solid barrier coat to which water-borne rather than solvent-borne paint was applied; (ii) the panels with dried water-borne paint were immersed for 3 minutes in fresh working composition; (iii) each working composition umbered 61, 62, or from 65 through 69 consisted of a mixture of 16 parts by volume of the Concentrate with the same number in Table 1 mixed with 86 parts by volume of deionized water; and (iv) each working composition numbered from 70 through 73 consisted of a mixture of 20 parts by volume of the Concentrate with the same number in Table 1 mixed with 80 parts by volume of deionized water. In every instance shown in Table 4, the paint was 100% removed by 3 minutes immersion, the removal bath became cloudy, and removed paint particles were observed to sink in the removal bath. Variable results are shown in Table 4; the values for non-filterable-residue (hereinafter usually abbreviated as "NFR") were obtained with a Hach Model DR2000 Spectrophotometer.

TABLE 4

| No. | Coverage Evaluation | NFR, milligrams/liter after: | | |
|---|---|---|---|---|
| | | 20 min | 30 min | ≥360 min |
| 61 | 90% covered; coating pulled away from edges | n.e. | n.e. | 70 |
| 62 | 90% covered; coating pulled away from edges | n.e. | n.e. | n.e. |
| 65 | 98% coverage | n.e. | n.e. | n.e. |
| 66 | 90% coverage; coating slightly pulled away from edges | n.e. | n.e. | n.e. |
| 67 | 95% coverage; coating slightly pulled away from edges | n.e. | n.e. | 68 |
| 68 | 99% coverage | n.e. | n.e. | 55 |
| 69 | 99% coverage | n.e. | n.e. | 18 |
| 70 | 95–100% coverage | 155 | 108 | 69 |
| 71 | 95–100% coverage | 395 | 188 | 71 |
| 72 | 100% coverage | 111 | 111 | 41 |
| 73 | 100% coverage; drying rings observed | 239 | 209 | 138 |

The invention claimed is:

1. An aqueous liquid composition suitable either as such or after dilution with water for simultaneously (i) removing a previously formed barrier coating and any paint residues thereon from a paint mask in a conventional power washer for paint masks and (ii) redepositing on the paint mask a barrier coating suitable for reuse of the paint mask, said aqueous liquid composition comprising:

(A) an amount of a component of dissolved organic film-forming polymer;
   (B) an amount of a component of dissolved inorganic salts; and
   (C) an amount of a component of dissolved organic molecules that (i) are hydrocarbons except for having hydroxyl substituents and, optionally, having one or more other types of substituents selected from halogen atoms, keto groups, and aldehydo groups, (ii) have a number ratio of oxygen atoms to carbon atoms that is at least 0.5, and (iii) are not part of any of the previously recited components.

2. An aqueous liquid composition according to claim 1, wherein: the amount of component (A) is from about 6.0 to about 50% of the total composition; the amount of component (B) has a ratio to the amount of component (A), measured as non-volatile solids on drying at 100° C. and normal atmospheric pressure, that is from about 0.10:1.0 to about 3.0:1.0; at least 20% of component (C) consists of a subcomponent (C.1) of molecules in which the number ratio of oxygen atoms to carbon atoms is at least 0.75:1.0; and said subcomponent (C.1) constitutes from about 1.0 to about 16% of the total aqueous liquid composition.

3. An aqueous liquid composition according to claim 2, wherein: component (A) consists essentially of nonionic polymers and has a weight average molecular weight from about 400 to about $10^5$; the amount of component (A) is from about 8.0 to about 30% of the total composition; component (B) comprises an amount of a subcomponent (B.1) selected from the group consisting of alkali metal phosphates and condensed phosphates and an amount of a subcomponent (B.2) selected from the group consisting of alkali metal borates and condensed borates such that the amount of (B.1) has a molar ratio to the amount of(B.2) that is from about 0.40:1.0 to about 8.0:1.0; the total amount of component (B) has a ratio to the amount of component (A), measured as non-volatile solids on drying at 100° C. and normal atmospheric pressure, that is from about 0.60:1.0 to about 2.5:1.0; at least 50% of component (C) consists of a subcomponent (C.1) of molecules in which the number ratio of oxygen atoms to carbon atoms is at least 0.85:1.0 and the number of carbon atoms is not greater than 6; and said subcomponent (C.1) constitutes from about 2.5 to about 10% of the total aqueous liquid composition.

4. An aqueous liquid composition according to claim 3, wherein: component (A) has a weight average molecular weight from about 600 to about $10^4$; the amount of component (A) is from about 9.0 to about 25% of the total composition; the amount of (B.1) has a molar ratio to the amount of (B.2) that is from about 0.50:1.0 to about 4.0:1.0; the total amount of component (B) has a ratio to the amount of component (A), measured as non-volatile solids on drying at 100° C. and normal atmospheric pressure, that is from about 0.70:1.0 to about 2.0:1.0; at least 65% of component (C) consists of a subcomponent (C.1) of molecules in which the number ratio of oxygen atoms to carbon atoms is at least 0.90:1.0 and the number of carbon atoms is not greater than 4; and subcomponent (C.1) constitutes from about 3.0 to about 7.5% of the total aqueous liquid composition.

5. An aqueous liquid composition according to claim 4, wherein: component (A) has is a weight average molecular weight from about 900 to about 6000; the amount of component (A) is from about 11.0 to about 18.0% of the total composition; the amount of (B.1) has a molar ratio to the amount of(B.2) that is from about 0.70:1.0 to about 1.9:1.0; the total amount of component (B) has a ratio to the amount of component (A), measured as non-volatile solids on drying at 100° C. and normal atmospheric pressure, that is from about 0.80:1.0 to about 1.5:1.0; and subcomponent (C.1) constitutes from about 3.5 to about 6.0% of the total aqueous liquid composition.

6. An aqueous liquid composition according to claim 5, wherein: component (A) consists essentially of polyacrylamide polymers and has a weight average molecular weight from about 1200 to about 2500; the amount of component (A) is from about 14.0 to about 16.0% of the total composition; the molar ratio of (B.1) to (B.2) is from about 0.80:1.0 to about 1.0:1.0; subcomponent (B.2) comprises both metaborate and tetraborate anions in amounts such that the amount of metaborate has a ratio to the amount of tetraborate that is from about 0.75:1.0 to about 1.05:1.0; the ratio of (B) to (A) is from about 0.85:1.0 to about 1.15:1.0; at least 65% of component (C) consists of an amount of a subcomponent (C.1) of molecules in which the number ratio of oxygen atoms to carbon atoms is at least 0.90:1.0 and the number of carbon atoms is not greater than 3; subcomponent (C.1) constitutes from about 4.3 to about 5.4% of the total aqueous liquid composition; component (C) also includes an amount of another subcomponent (C.2) selected from the group consisting of molecules in which the number ratio of oxygen atoms to carbon atoms is from 0.65 to 0.69; the amount of component (C.1) has a ratio to the amount of component (C.2) that is from about 2.30:1.0 to about 2.70:1.0; and the composition also comprises an amount of free boric acid that has a ratio to the sum of the amounts of components (A) and (C) that is from 0.040:1.0 to 0.060:1.0.

7. An aqueous liquid composition according to claim 2, wherein: component (A) comprises an amount of a subcomponent (A.1), which has a weight average molecular weight from about 400 to about $10^5$, selected from the group consisting of nonionic polymers and an amount of a subcomponent (A.2), which has a weight average molecular weight from about $10^3$ to about $10^7$, selected from the group consisting of cationic polymers; the amount of (A.1) has a ratio to the amount of (A.2) that is from about 0.60:1.0 to about 6.0:1.0; the amount of component (A) is from about 15.0 to about 41% of the total composition; the amount of component (B) has a ratio to the amount of component (A), measured as non-volatile solids on drying at 100° C. and normal atmospheric pressure, that is from about 0.10:1.0 to about 0.60:1.0; at least 50% of component (C) consists of a subcomponent (C.1) of molecules in which the number ratio of oxygen atoms to carbon atoms is at least 0.75:1.0 and the number of carbon atoms is not more than 4; and subcomponent (C.1) constitutes from about 3.5 to about 7.5% of the total aqueous liquid composition.

8. An aqueous liquid composition according to claim 7, wherein: component (A) consists essentially of an amount of a subcomponent (A.1), which has a weight average molecular weight from about 600 to about $10^4$, selected from the group consisting of nonionic polymers and an amount of a subcomponent (A.2), which has a weight average molecular weight from about $10^4$ to about $10^7$, selected from the group consisting of cationic polymers; the ratio of (A.1) to (A.2) is from about 1.20:1.0 to about 4.4:1.0; the amount of component (A) is from about 19.5 to about 36% of the total composition; the ratio of (3) to (A) is from about 0.14:1.0 to about 0.40:1.0; at least 65% of component (C) consists of a subcomponent (C.1) of molecules in which the number ratio of oxygen atoms to carbon atoms is at least 0.85:1.0; and subcomponent (C.1) constitutes from about 2.5 to about 10% of the total aqueous liquid composition.

9. An aqueous liquid composition according to claim 8, wherein: component (A) consists essentially of an amount of a subcomponent (A.1), which has a weight average molecular weight from about 900 to about 8000, selected from the group consisting of nonionic polymers and an amount of a subcomponent (A.2), which has a weight average molecular weight from about $10^5$ to about $10^7$, selected from the group consisting of cationic polymers; the ratio of (A.1) to (A.2) is from about 1.60:1.0 to about 3.2:1.0; the amount of component (A) is from about 27 to about 33% of the total composition; the ratio of (B) to (A) is from about 0.17:1.0 to about 0.32:1.0; and subcomponent (C.1) constitutes from about 2.5 to about 10% of the total aqueous liquid composition.

10. An aqueous liquid composition according to claim 9, wherein: component (A) consists essentially of an amount of a subcomponent (A.1) of polyacrylamide polymers that have a weight average molecular weight from about 1200 to about 2500 and an amount of a subcomponent (A.2), which has a weight average molecular weight from about $10^6$ to about $10^7$, selected from the group consisting of cationic polymers made by the joint polymerization of epichlorohydrin, dimethylamine, and ethylene diamine; the ratio of (A.1) to (A.2) is from about 1.80:1.0 to about 2.20:1.0; the amount of component (A) is from about 27.0 to about 33.0% of the total composition; the ratio of (B) to (A) is from about 0.200:1.0 to about 0.240:1.0; at least 65% of component (C) consists of a subcomponent (C.1) of molecules in which the number ratio of oxygen atoms to carbon atoms is at least 0.90:1.0 and the number of carbon atoms is not more than 3; subcomponent (C.1) constitutes from about 4.3 to about 5.4% of the total aqueous liquid composition; component (C) also includes an amount of another subcomponent (C.2) selected from the group consisting of molecules in which the number ratio of oxygen atoms to carbon atoms is from 0.65 to 0.69; the amount of component (C.1) has a ratio to the amount of component (C.2) that is from about 2.30:1.0 to about 2.70:1.0; and the composition also comprises an amount of free boric acid that has a ratio to the sum of the amounts of components (A) and (C) that is from 0.024:1.0 to 0.030:1.0.

11. A process comprising a step of contacting an aqueous liquid composition according to claim 1 with a surface of a solid substrate that is not soluble in the composition, said contacting being for a sufficient time to accomplish at least one of: (1) removing from said surface any paint residues present thereon and (2) forming on said surface a liquid layer of the composition, said liquid layer having the properties that it (2.1) adheres to said surface when said solid substrate is removed from contact with any part of said composition according to the invention that is not part of said liquid layer and (2.2) when dried in place on said surface of said solid substrate, forms a solid water soluble coating over said surface.

12. A process according to claim 11, wherein, in said aqueous liquid composition: there is a pH value from about 7.5 to about 11.0; the amount of component (A) is from about 6.0 to about 50% of the total composition; the amount of component (B) has a ratio to the amount of component (A), measured as non-volatile solids on drying at 100° C. and normal atmospheric pressure, that is from about 0.10:1.0 to about 3.0:1.0; at least 20% of component (C) consists of a subcomponent (C.1) of molecules in which the number ratio of oxygen atoms to carbon atoms is at least 0.75:1.0; and said subcomponent (C.1) constitutes from about 1.0 to about 16% of the total aqueous liquid composition.

13. A process according to claim 12, wherein, in said aqueous liquid composition: there is a pH value from about 8.2 to about 10.0; component (A) consists essentially of nonionic polymers and has a weight average molecular weight from about 400 to about $10^5$; the amount of component (A) is from about 8.0 to about 30% of the total composition; component (B) comprises an amount of a subcomponent (B.1) selected from the group consisting of alkali metal phosphates and condensed phosphates and an amount of a subcomponent (B.2) selected from the group consisting of alkali metal borates and condensed borates such that the amount of (B.1) has a molar ratio to the amount of (B.2) that is from about 0.40:1.0 to about 8.0:1.0; the total amount of component (B) has a ratio to the amount of component (A), measured as non-volatile solids on drying at 100° C. and normal atmospheric pressure, that is from about 0.60:1.0 to about 2.5:1.0; at least 50% of component (C) consists of a subcomponent (C.1) of molecules in which the number ratio of oxygen atoms to carbon atoms is at least 0.85:1.0 and the number of carbon atoms is not greater than 6; and said subcomponent (C.1) constitutes from about 2.5 to about 10% of the total aqueous liquid composition.

14. A process according to claim 13, wherein, in said aqueous liquid composition: there is a pH value from about 8.4 to about 9.6; component (A) has a weight average molecular weight from about 600 to about $10^4$; the amount of component (A) is from about 9.0 to about 25% of the total composition; the amount of (B.1) has a molar ratio to the amount of (B.2) that is from about 0.50:1.0 to about 4.0:1.0; the total amount of component (B) has a ratio to the amount of component (A), measured as non-volatile solids on drying at 100° C. and normal atmospheric pressure, that is from about 0.70:1.0 to about 2.0:1.0; at least 65% of component (C) consists of a subcomponent (C.1) of molecules in which the number ratio of oxygen atoms to carbon atoms is at least 0.90:1.0 and the number of carbon atoms is not greater than 4; and subcomponent (C.1) constitutes from about 3.0 to about 7.5% of the total aqueous liquid composition.

15. A process according to claim 14, wherein, in said aqueous liquid composition: component (A) has a weight average molecular weight from about 900 to about 6000; the amount of component (A) is from about 11.0 to about 18.0% of the total composition; the amount of (B.1) has a molar ratio to the amount of (B.2) that is from about 0.70:1.0 to about 1.9:1.0; the total amount of component (B) has a ratio to the amount of component (A), measured as non-volatile solids on drying at 100° C. and normal atmospheric pressure, that is from about 0.80:1.0 to about 1.5:1.0; and subcomponent (C.1) constitutes from about 3.5 to about 6.0% of the total aqueous liquid composition.

16. A process according to claim 15, wherein, in said aqueous liquid composition: there is a pH value from about 8.90 to about 9.20; component (A) consists essentially of polyacrylamide polymers and has a weight average molecular weight from about 1200 to about 2500; the amount of component (A) is from about 14.0 to about 16.0% of the total composition; the molar ratio of (B3.1) to (B.2) is from about 0.80:1.0 to about 1.0:1.0; subcomponent (B.2) comprises both metaborate and tetraborate anions in amounts such that the amount of metaborate has a ratio to the amount of tetraborate that is from about 0.75:1.0 to about 1.05:1.0; the ratio of (B) to (A) is from about 0.85:1.0 to about 1.15:1.0; at least 65% of component (C) consists of an amount of a subcomponent (C.1) of molecules in which the number ratio of oxygen atoms to carbon atoms is at least 0.90:1.0 and the number of carbon atoms is not greater than 3; subcomponent (C.1) constitutes from about 4.3 to about 5.4% of the total aqueous liquid composition; component (C) also includes an amount of another subcomponent (C.2) selected from the group consisting of molecules in which the number ratio of oxygen atoms to carbon atoms is from 0.65 to 0.69; the amount of component (C.1) has a ratio to the amount of component (C.2) that is from about 2.30:1.0 to about 2.70:1.0; and the composition also comprises an amount of free boric acid that has a ratio to the sum of the amounts of components (A) and (C) that is from 0.040:1.0 to 0.060:1.0.

17. A process according to claim 12, wherein, in said aqueous liquid composition: component (A) comprises an amount of a subcomponent (A.1), which has a weight average molecular weight from about 400 to about $10^5$, selected from the group consisting of nonionic polymers and an amount of a subcomponent (A.2), which has a weight average molecular weight from about $10^3$ to about $10^7$, selected from the group consisting of cationic polymers; the amount of (A.1) has a ratio to the amount of (A.2) that is from about 0.60:1.0 to about 6.0:1.0; the amount of component (A) is from about 15.0 to about 41% of the total composition; the amount of component (B) has a ratio to the amount of component (A), measured as non-volatile solids on drying at 100° C. and normal atmospheric pressure, that is from about 0.10:1.0 to about 0.60:1.0; at least 50% of component (C) consists of a subcomponent (C.1) of molecules in which the number ratio of oxygen atoms to carbon atoms is at least 0.75:1.0 and the number of carbon atoms is not more than 4; and subcomponent (C.1) constitutes from about 3.5 to about 7.5% of the total aqueous liquid composition.

18. A process according to claim 17, wherein, in said aqueous liquid composition: component (A) consists essentially of an amount of a subcomponent (A.1), which has a weight average molecular weight from about 600 to about $10^4$, selected from the group consisting of nonionic polymers and an amount of a subcomponent (A.2), which has a weight average molecular weight from about $10^4$ to about $10^7$, selected from the group consisting of cationic polymers; the ratio of (A.1) to (A.2) is from about 1.20:1.0 to about 4.4:1.0; the amount of component (A) is from about 19.5 to about 36% of the total composition; the ratio of (B) to (A) is from about 0.14:1.0 to about 0.40:1.0; at least 65% of component (C) consists of a subcomponent (C.1) of molecules in which the number ratio of oxygen atoms to carbon atoms is at least 0.85:1.0; and subcomponent (C.1) constitutes from about 2.5 to about 10% of the total aqueous liquid composition.

19. A process according to claim 18, wherein, in said aqueous liquid composition: component (A) consists essentially of an amount of a subcomponent (A.1), which has a weight average molecular weight from about 900 to about 8000, selected from the group consisting of nonionic polymers and an amount of a subcomponent (A.2), which has a weight average molecular weight from about $10^5$ to about $10^7$, selected from the group consisting of cationic polymers; the ratio of (A.1) to (A.2) is from about 1.60:1.0 to about 3.2:1.0; the amount of component (A) is from about 27 to about 33% of the total composition; the ratio of (B) to (A) is from about 0.17:1.0 to about 0.32:1.0; and subcomponent (C.1) constitutes from about 2.5 to about 10% of the total aqueous liquid composition.

20. A process according to claim 19, wherein, in said aqueous liquid composition: component (A) consists essentially of an amount of a subcomponent (A.1) of polyacrylamide polymers that have a weight average molecular weight from about 1200 to about 2500 and an amount of a subcomponent (A.2), which has a weight average molecular weight from about $10^6$ to about $10^7$, selected from the group consisting of cationic polymers made by the joint polymerization of epichlorohydrin, dimethylamine, and ethylene diamine; the ratio of (A.1) to (A.2) is from about 1.80:1.0 to about 2.20:1.0; the amount of component (A) is from about 27.0 to about 33.0% of the total composition; the ratio of (B) to (A) is from about 0.200:1.0 to about 0.240:1.0; at least 65% of component (C) consists of a subcomponent (C.1) of molecules in which the number ratio of oxygen atoms to carbon atoms is at least 0.90:1.0 and the number of carbon atoms is not more than 3; subcomponent (C.1) constitutes from about 4.3 to about 5.4% of the total aqueous liquid composition; component (C) also includes an amount of another subcomponent (C.2) selected from the group consisting of molecules in which the number ratio of oxygen atoms to carbon atoms is from 0.65 to 0.69; the amount of component (C.1) has a ratio to the amount of component (C.2) that is from about 2.30:1.0 to about 2.70:1.0; and the composition also comprises an amount of free boric acid that has a ratio to the sum of the amounts of components (A) and (C) that is from 0.024:1.0 to 0.030:1.0.

* * * * *